Feb. 21, 1928.   1,659,796
C. W. WILSON
FAUCET
Filed July 6, 1925   2 Sheets-Sheet 1

INVENTOR.
C. W. Wilson
BY
ATTORNEY

Feb. 21, 1928.　　　　　　　　　　　　　　　　1,659,796
C. W. WILSON
FAUCET
Filed July 6, 1925　　　　2 Sheets-Sheet 2

INVENTOR.
C. W. Wilson
BY
ATTORNEY

Patented Feb. 21, 1928.

1,659,796

UNITED STATES PATENT OFFICE.

CHARLES W. WILSON, OF RENTON, WASHINGTON.

FAUCET.

Application filed July 6, 1925. Serial No. 41,800.

This invention relates to an improvement in faucets and is particularly designed to provide a faucet in which the flow of water is controlled by a hand operated valve in the usual manner, with the construction such that the passage of water through the faucet may be cut off at will independent of the valve to thereby permit the separation of the valve from the faucet for repair or replacement without the necessity of cutting off the water supply through the whole system, as is now usually practiced.

The invention comprises a faucet having the usual water bore therethrough interrupted by a circular partition formed with opposed openings for the passage of the water, a cut off in the form of a conical sleeve seating in a leak-proof manner in the partition, the cut off having openings which may be brought into registry with the openings in the partition to provide for water passage therethrough or disposed out of line with such openings to prevent passage of water therethrough. A valve seat sleeve is adapted to fit within the cut off and to be normally held in a wedging relation with such cut off, the valve seat of the sleeve being adapted to be engaged by the usual valve for manually controlling the supply from the faucet in the usual manner. Manually operable means are provided whereby the sleeve may be initially raised out of wedging cooperation with the cut off and the cut off turned to interrupt the supply through the faucet, the sleeve and valve parts being then readily withdrawn from the cut off for replacement or repair of the valve.

In the drawings:—

Figure 1:
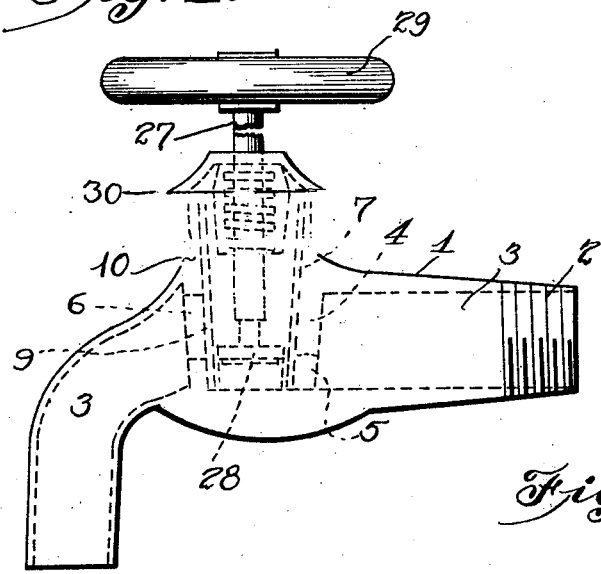
Fig. 1 is a view in side elevation partly in section showing the faucet with the details of the present invention applied thereto.
Figure 3:
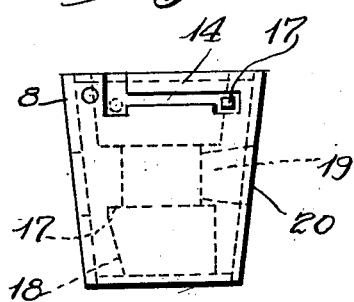
Fig. 3 is a similar view taken from the opposite side, the valve, valve stem, and operating nut, being removed.
Figure 2:
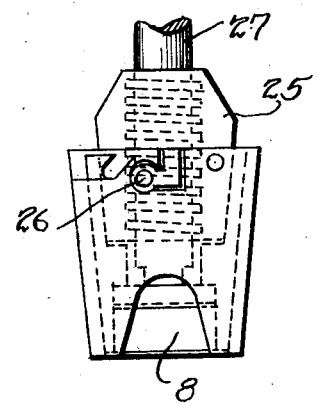
Fig. 2 is an enlarged view showing the cut off valve-seat sleeve therein and cooperating valve parts, the view being taken at right angles to that of Fig. 1.
Figure 4:
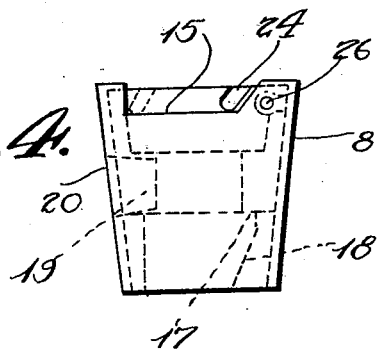
Fig. 4 is a view similar to Fig. 3 from the opposite side.
Figure 5:
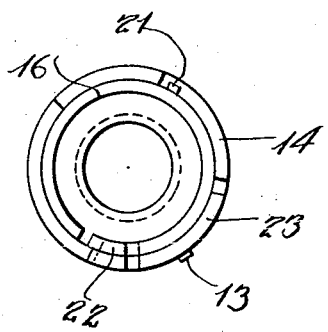
Fig. 5 is a plan view of Fig. 2, the operating valve parts being removed.
Figure 6:
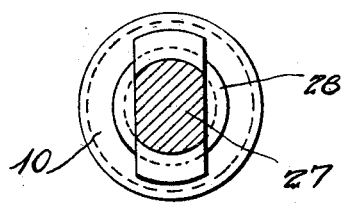
Fig. 6 is a transverse section taken just above the cut off in Fig. 2.

The faucet housing 1 of the present improvement is of usual construction, being threaded at 2 for connection in the pipe system and having a longitudinal water bore 3. For the purposes of the present invention, this bore is interrupted by a cylindrical tapered partition 4 extending across the bore and formed with an inlet 5 near the bottom of the bore and a diametrically opposed outlet 6 near the top of the bore. A cut off 7 in the form of a conical sleeve-like member adapted to seat under pressure in a leak-proof manner within the partition 4, is formed with an inlet 8 to register with the inlet 5 of the faucet partition and an outlet 9 to register with the outlet 6 of the faucet partition.

The faucet 1 has the usual upstanding hollow boss or extension 10, through which the valve parts are insertable, and the wall of this extension is formed with a channel 11 having an entrance 12 through the upper edge and serving through the medium of a pin 13 carried by the cut off 7 to hold the cut off in proper position in the partition 4, while at the same time permitting its relative rotation to dispose the inlet and outlet of said cut off in or out of registry with the inlet and outlet of the partition. The cut off 7 is formed with a similar channel 14, and diametrically opposite the channel 14, the upper edge of the cut off is reduced or cut away at 15.

A valve sleeve 16 of conical form is adapted to seat in a leak-proof manner within the cut off 7, this sleeve, hereinafter termed the valve sleeve, having an inwardly extending abutment, the lower edge of which forms a valve seat 17. This sleeve is provided with a cutaway portion at its lower end, as at 18, which, when the parts are in position to control the flow of water through the faucet by the valve, registers with the inlets 5 and 8 of the partition 4 and cut off 7. A cylindrical channel 19 is formed in the valve sleeve having an outlet 20 to align with the outlets 9 and 6 of the cut off and partition when the parts are in operative position. The valve sleeve has a stud 21 adapted to coact with the channel 14 in the cut off and is further provided with a channel 22 which, when the parts are in operative relation, registers with a similar channel 23 formed in the cut off 7. The valve sleeve is also formed, in that portion registering with the reduced portion 15 of the cut out, with a downwardly extended recess 24.

An operating member 25, in the form of a nut, is adapted to seat in the upper portion of the valve sleeve 16, this portion of the valve sleeve being tapered and the nut being formed to accurately fit the same. This operating member has a stud 26 adapted to simultaneously coact with the channels 22 and 23 of the valve sleeve and cut off. A valve stem 27 is threaded through the operating member 25, being provided at its lower end with the usual or any preferred type of valve 28 arranged to cooperate from beneath with the seat 17, the stem being provided at its upper end with the usual hand wheel or other operating means 29.

Figure 7:
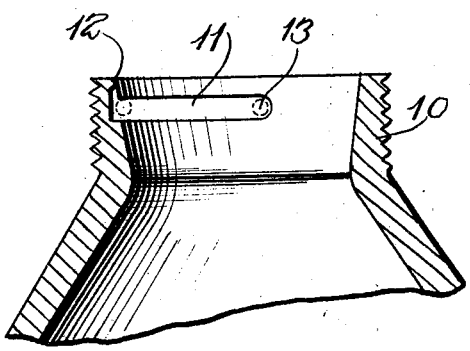
Fig. 7 is a vertical sectional view of the faucet housing showing the means for holding the cut off in position.
Figure 8:
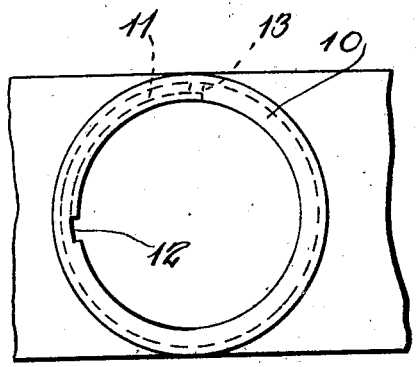
Fig. 8 is a plan of the same.
Figure 9:
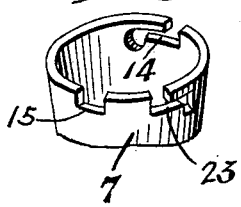
Fig. 9 is a broken perspective of the cut off.
Figure 10:
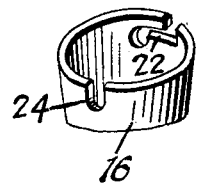
Fig. 10 is a broken perspective of the valve sleeve.

In assembling the parts, the cut off is placed in the housing and secured in the channel 11, the rotation of the cut off to the limit of the channel placing the inlet and outlet 8 and 9 of such cut off in alignment with the inlet and outlet of the faucet partition. If desired, entrance to the channel 11 may be closed by forcing the material of the walls of such channel together, as shown in Fig. 7 to prevent the accidental separation of the cut off when in position. The valve stem 27 is inserted through the valve sleeve 16 from beneath and the operating member 25 is threaded down upon the threads of the valve stem. The valve sleeve is then placed within the cut off so that the channel 22 of such sleeve registers with the channel 23 of the cut off. The member 25 is then manipulated to insert its stud 26 into the channels 22 and 23, and then by rotating the operating member, this stud will reach the ends of the channels with the stud 21 of the valve sleeve seating in the channel 14 of the cut off. A packing nut 30 is then threaded upon the extension 10 bearing upon and forcing downwardly the locking operating member so as to force all parts to a relatively sealing cooperation. The flow of fluid is then controlled through manipulation of the valve 28. When it is desired to remove this valve for repair or renewal, the packing nut 30 is loosened and the valve stem moved downwardly until the valve comes in contact with the bottom of the faucet bore within the partition. Further movement will cause the operating member to move upwardly until the stud 26 comes in contact with a circular portion of the channel 22 of the valve sleeve 16. It will be apparent from the drawings that the upper edge of this channel 22 in the valve sleeve is slightly below the similar edge of the registering channel 23 in the cut off 7. The described upward movement of the operating member thereby lifts the valve sleeve from its frictional engagement with the cut off and as the interfit of these parts is a conical one, this slight upward movement of the valve sleeve tends to free the latter from the cut off. The packing nut 30 may then be removed and the user by manipulating the operating member 25 rotates the cut off and valve sleeve until the stud 13 reaches the opposite limit of the channel 11, in which position the flow openings in the cut off are out of line with the flow openings in the faucet partition, and all possible flow of fluid is cut off. The movement of the operating member 25 is then reversed until the stud 26 has reached the limit of its travel in the channel 14. Following this, the operating member is raised out of the channel 14 and turned until its stud 26 is in line with the recess 24. By depressing the operating member, the stud 26 is moved into this recess, following which the valve sleeve is turned until its stud 21 is free of the channel 14. The valve sleeve, valve, valve stem, and operating member, may be then freely removed for repair or replacement, while the cut off prevents any possible flow of fluid through the faucet.

Claims:

1. A faucet having a fluid bore, an annular partition interrupting the bore and formed with passages in vertically offset relation, a cut off formed with openings to permit the passage of the fluid and rotatably mounted in sealing relation within said partition, a valve sleeve rotatable in the cut off and formed with a valve seat, a valve cooperating with said seat, a valve stem projecting upwardly through the valve sleeve, and an operating member threaded upon the stem and formed with means to simultaneously rotate the cut off and valve sleeve and independently operate the valve sleeve to a position free of the cut off.

2. A faucet having a fluid bore, an annular partition interrupting the bore and formed with opposed fluid openings, a cut off having an interlocking engagement with the faucet and formed with openings, said cut off being rotatable to arrange said openings in or out of registry with the openings in the partition, a valve sleeve fitting within the cut off, means for interconnecting the valve sleeve and cut off while permitting independent rotary movement of the valve sleeve, a valve seat formed in the valve sleeve, a valve cooperating with said seat from beneath, a valve stem projecting upwardly through the valve sleeve, and an operating member threaded on the stem and having a stud to cooperate with channels in the cut off and valve sleeve to initially operate the cut off and sleeve to a position to move the openings in the cut off out of registry with the openings in the partition and thereafter move the sleeve to free it from the valve.

3. A faucet having a fluid bore, an annular partition interrupting the bore and formed with opposed fluid openings, a cut off having an interlocking engagement with the faucet and formed with openings, said cut off being rotatable to arrange said openings in or out of registry with the openings in the partition, a valve sleeve fitting within the cut off, means for interconnecting the valve sleeve and cut off while permitting independent rotary movement of the valve sleeve, a valve seat formed in the valve sleeve, a valve cooperating with said seat from beneath, a valve stem projecting upwardly through the valve sleeve, and an operating member threaded on the stem and having a stud to cooperate with channels in the cut off and valve sleeve to initially operate the cut off and sleeve to a position to move the openings in the cut off out of registry with the openings in the partition and thereafter move the sleeve to free it from the valve, and means cooperating with the faucet to normally hold the operating member in fixed position in the valve sleeve.

4. A faucet having a fluid bore, an annular partition interrupting the bore and formed with opposed fluid openings, a cut off having an interlocking engagement with the faucet and formed with openings in or out of registry with the openings in the partition, a valve sleeve fitting within the cut off, means for interconnecting the valve sleeve and cut off while permitting independent rotary movement of the valve sleeve, a valve seat formed in the valve sleeve, a valve cooperating with said seat from beneath, a valve stem projecting upwardly through the valve sleeve, and an operating member threaded on the stem and having a stud to cooperate with channels in the cut off and valve sleeve to initially operate the cut off and sleeve to a position to move the openings in the cut off out of registry with the openings in the partition and thereafter move the sleeve to free it from the valve, said operating member having a binding engagement with the valve sleeve, and a packing nut engaging the faucet and holding said operating member in such binding engagement.

5. A faucet having a fluid bore, an annular partition interrupting the bore and formed with opposed fluid openings, a cut off having an interlocking engagement with the faucet and formed with openings, said cut off being rotatable to arrange said openings in or out of registry with the openings in the partition, a valve sleeve fitting within the cut off, said valve sleeve being formed with a fluid channel to establish communication between the openings in the cut off, means for interconnecting the valve sleeve and cut off while permitting independent rotary movement of the valve sleeve, a valve seat formed in the valve sleeve, a valve cooperating with said seat from beneath, a valve stem projecting upwardly through the valve sleeve, and an operating member threaded on the stem and having a stud to cooperate with channels in the cut off and valve sleeve to initially operate the cut off and sleeve to a position to move the openings in the cut off out of registry with the openings in the partition and thereafter move the sleeve to free it from the valve.

In testimony whereof I affix my signature.

CHARLES W. WILSON.